Patented Aug. 30, 1938

2,128,684

UNITED STATES PATENT OFFICE 2,128,684

CHRYSENE CARBOXYLIC ACIDS AND A PROCESS OF PREPARING THEM

Heinrich Vollmann, Frankfort-on-the-Main-Hochst, and Hans Becker, Hofheim in Taunus, Germany, assignors to General Aniline Works, Inc., New York, N. Y., a corporation of Delaware No Drawing. Application August 14, 1935, Serial No. 36,212. In Germany August 18, 1934

8 Claims. (Cl. 260—515)

The present invention relates to chrysene carboxylic acids and to a process of preparing them.

In the literature there have hitherto been described two chrysene carboxylic acids: the chrysene-1-carboxylic acid which has been prepared in a synthetic way by Weitzenböck and Lieb (Monatshefte der Chemie, vol. 33, page 559) and a chrysene-mono-carboxylic acid melting at 303° C. prepared from chrysene and oxalyl chloride with a moderate yield by Liebermann and Zsuffa (Berichte der Deutschen Chemischen Gesellschaft, vol. 44, pages 202 to 210).

Now, we have found that chrysene carboxylic acids may be obtained in a simple manner by causing chrysenes containing halogen in their nuclei to react with cuprous cyanide at a temperature above 200° C. and treating the nitriles obtained with a saponifying agent.

The mono-halogen-chrysenes, used for the preparation of the chrysene-mono-carboxylic acids according to the present process, have hitherto been unknown. They may be obtained easily and with a good yield, as will be shown in Examples 1 and 2, by chlorination or bromination of chrysene in an organic solvent.

The chrysene nitrile, melting at 193° C., obtainable according to Example 1 from chlorochrysene or according to Example 2 from bromochrysene yields on saponification chrysene-2-carboxylic acid, melting at 314° C. The monohalogen-chrysenes (chlorochrysene, melting at 162° C., and bromochrysene, melting at 152° C.) used as starting materials are also chrysene-2-derivatives.

Furthermore, by reduction of the known mono-nitro-chrysene, melting at 209° C., to the likewise known mono-amino-chrysene, melting at 206° C. (in the literature the compound is said to have the melting point of 201 C. to 203° C. and 199° C.), diazotization of the amine and reaction with potassium cuprous cyanide solution according to Sandmeyer, we have obtained a chrysene-nitrile which, on sublimation in the vacuum and crystallization from chlorobenzene or glacial acetic acid, crystallizes in the form of colorless needles, melting at 193° C. Its melting point and mixture melting point show that this chrysene-nitrile is identical with the chrysene-2-nitrile obtainable according to the present process from 2-chloro- or 2-bromo-chrysene. The mono-nitro chrysene melting at 209° C. is therefore the 2-nitro-chrysene. The numbering of the chrysene ring system is that suggested by M. Richter in "Lexikon der Kohlenstoffverbindungen", 3rd ed. 1910, Vol. I, page 25, No. 337:

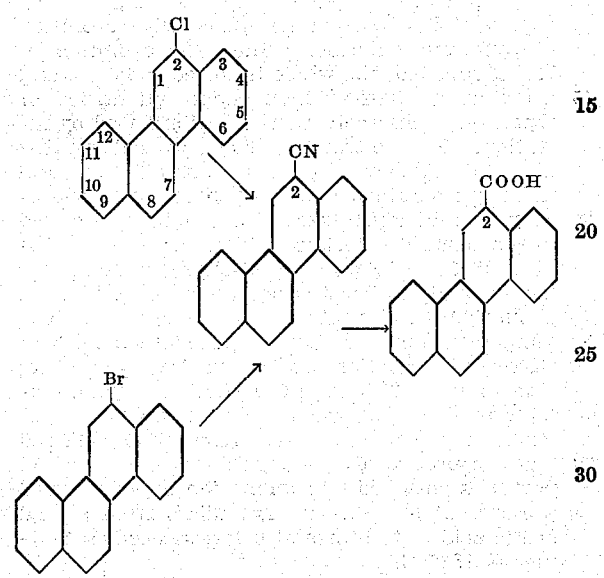

The known dihalogen-chrysene obtainable by direct halogenation of chrysene, the dichlorochrysene melting at 268° C. and the dibromochrysene melting at 273° C., are chrysene-2,8-derivatives. This is shown, for instance, by the fact that on nitration of 2-chlorochrysene and on chlorination of 2-nitrochrysene one and the same chloronitrochrysene melting at 310° C. is obtained which, consequently, has the structure of a 2- chloro-8-nitrochrysene. By treating it with PCl₅ in boiling trichlorobenzene, the known dichlorochrysene melting at 268° C. is obtained. The dicarboxylic acid obtained from these dihalogenchrysenes is, therefore, the chrysene-2,8-dicarboxylic acid.

The chrysene-carboxylic acids obtainable according to the present process may be used as intermediate products for the preparation of dyestuffs, either directly (for instance, by reaction with amino-anthraquinones) or after further transformation (for instance, nitration and reduction to amino-carboxylic acids or oxidation to the chrysene-quinone-carboxylic acid, and so on).

According to the present invention a series of new products is obtained, for instance, those of the following general formula:

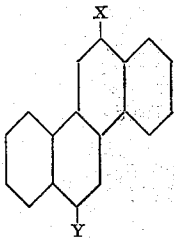

wherein X means a cyano or a carboxyl group and Y means a cyano, a carboxyl, hydroxy, acetoxy, or an amino group. The following examples serve to illustrate the invention; the parts are by weight, unless otherwise stated:

1. 228 parts of chrysene are stirred in a finely dispersed state with 2000 parts of nitrobenzene and at ordinary temperature 150 parts of sulfurylchloride are added. The temperature is then gradually raised to about 120° C., whereby complete dissolution takes place with evolution of hydrogen chloride. When the evolution of HCl is finished, the whole is cooled to 20° C. and after about half-an-hour small quantities of separated dichlorochrysene are eliminated by filtration. The filtrate is concentrated or the nitrobenzene is expelled by means of steam and there are obtained about 200 parts of 2-chlorochrysene. It crystallizes from glacial acetic acid in the form of colorless brilliant leaflets melting at 162° C. 132 parts of 2-chlorochrysene are melted and, while stirring, there are added at about 200° C. 50 parts of cuprous cyanide. The temperature is then further raised to about 310° C., whereby reaction occurs and the temperature rises to about 360° C. After stirring for half-an-hour at about 320° C., the dark entirely homogeneous melt is poured out. From the crystallized reaction product the 2-cyanochrysene (about 110 parts) is obtained by sublimation under reduced pressure at 320° C. It crystallizes from glacial acetic acid in the form of colorless needles melting at 193° C.

100 parts of chrysene-2-nitrile are heated at 190° C. for 8 hours in an iron autoclave with 200 parts of caustic soda solution of 35% content of NaOH and 400 parts of water. After cooling, the batch is diluted with hot water until all the separated sodium salt of the carboxylic acid is dissolved; it is filtered, if necessary, and the solution is acidified. After filtering with suction, washing and drying about 100 parts of nearly colorless chrysene-2-carboxylic acid are obtained. It crystallizes from nitrobenzene in the form of long brilliant colorless needles, melting at 314° C.

2. By causing 170 parts of bromine to react with 228 parts of chrysene which have been stirred with 2000 parts of nitrobenzene and otherwise working according to the statements given for the mono-chlorination of chrysene in Example 1, about 220 parts of 2-bromo-chrysene are obtained. It crystallizes from benzene in the form of colorless brilliant small tablets melting at 152° C.

The reaction with cuprous cyanide is performed analogously to that described in Example 1, paragraph 2, and the chrysene-2-nitrile described in this example is obtained. The saponification may be carried out in an alkaline medium, as described in the preceding example or by means of a mixture of 3 parts of concentrated sulfuric acid with 2 parts of water by heating in a reflux apparatus for several hours at about 165° C.

3. 100 parts of cuprous-cyanide are introduced at 300° C. into a melt of 150 parts of 2,8-dichlorochrysene (melting at 267–268° C.) while stirring, and the temperature is gradually raised to 400° C. after one hour the homogeneous dark melt is poured on a plate, whereby it solidifies to a hard crystalline mass. The 2,8-dicyanchrysene thus obtained is freed from inorganic admixtures by sublimation under reduced pressure at a temperature between about 300–420° C. and purified by recrystallization from alpha-chloronaphthalene. It is obtained in the form of long feebly yellowish needles, melting at 406° C.

50 parts of the chrysene-2, 8-di-nitrile thus prepared are heated at 180–200° C. in an iron autoclave for 5 hours with 500 parts of alcohol and 100 parts of caustic potash. After cooling the separated crystalline sodium salt is filtered with suction from the alcohol and, if necessary, recrystallized from water. It forms long colorless needles having a silk-like lster. By acidification, the free chrysene-2, 8-dicarboxylic acid (about 53 parts) is obtained. It forms a lemon-yellow powder which is nearly insoluble in neutral solvents of high-boiling point and melts not below 400° C.

4. 200 parts of dibromo-chrysene melting at 276° C. (obtainable by bromination of chrysene in 10 times its weight of nitrobenzene with the theoretical amount of bromine and 10% thereof in excess at a temperature beginning with 20° C. and rising finally up to about 120° C.; the crude product obtained with a yield of 93% melts at about 272° C. after feeble sintering and may be obtained in an entirely pure state by a single recrystallization from nitrobenzene. For the reaction herein described, the crude product may be used) are heated to boiling, while stirring together with 98 parts of cuprous cyanide in 700 parts by volume of benzyl-cyanide. At boiling temperature the whole entirely dissolves temporarily to a dark-brown solution, whereupon, after a few minutes, reaction occurs with vivid boiling. The reaction product separates still at boiling temperature, in the shape of light yellowish grey needles which form a thick magna. The whole is maintained at boiling temperature for 5 minutes and after cooling to about 80° C. it is filtered with suction. After elimination of the adhering mother liquor, for instance, by washing with acetone until the acetone used remains uncolored, the residue is warmed with nitric acid of 15% strength in order to dissolve copper salts which may be present, again filtered with suction, washed with water and dried. The average yield is 136 parts of almost pure dicyanchrysene, i. e. 94% of the theoretical. The product is identical with that obtainable according to Example 3, paragraph 1.

The saponification may be carried out according to Example 3, paragraph 2, or according to the following process: 300 parts of 2,8-chrysene-dinitrile, obtainable according to the above process are heated, while stirring at 180–200° C. for 5 hours in an iron autoclave with 600 parts of caustic soda solution of 40% strength and 1800 parts of water. On cooling, the sodium salt of chrysene-dicarboxylic acid crystallizes from the solution which has been filtered while hot. By acidification the light yellow free dicarboxylic acid is obtained with a very good yield. The chrysene-2,8-dicarboxylic acid-chloride, obtained from the acid by heating with phosphorus pentachloride in trichlorobenzene, crystallizes from trichlorobenzene in the form of brilliant yellow needles melting at 302° C. and having a length of about one centimeter.

5. 200 parts of 2-nitro-8-bromochrysene are heated to boiling with 800 parts by volume of benzylcyanide with addition of 60 parts of cuprous cyanide, whereby a yellow brown solution is obtained. After about a quarter of an hour the whole is allowed to cool and the reaction product which has separated in the form of yellow needles is filtered with suction. It is washed and freed from copper salts by boiling with dilute nitric acid, as described in Example 4. 145 parts of 2-nitrochrysene-8-nitrile, i. e. 81% of the theoretical, are obtained. The crude product melts at 362–365° C., whereas after recrystallization from nitrobenzene the melting point is constant at 366° C.–367° C.

By reduction and heating with caustic soda solution under pressure according to the manner described in Example 4, paragraph 2, 2-aminochrysene-8-carboxylic acid is obtained. By crystallization from glacial acetic acid small yellow prisms melting above 365° C. are obtained. It dissolves in alcohol or glacial acetic acid, the very dilute solutions showing an intensive blue fluorescence. As by-products there are obtained carboxylic acids which are more yellow in color and dissolve in concentrated sulfuric acid to a green to blue-green solution; they are probably azine-carboxylic acids.

6. 324 parts of 2-acetoxy-8-bromo-chrysene (obtainable from 2-acetoxychrysene melting at 157° C. by bromination in chloroform at about 20° C. with 1 molecular proportion of bromine; crystallizing from chlorobenzene in the form of colorless needles melting at 206° C.–207° C.) are heated to boiling in 700 parts of benzyl-cyanide with 90 parts of cuprous cyanide until complete dissolution takes place; the whole is then heated to boiling for a further half-an-hour in a reflux apparatus. After cooling, the crude nitrile which has separated in the form of crystals is filtered with suction and washed with alcohol. The yield amounts to about 240 parts, i. e. 87% of the theoretical. By recrystallization from chlorobenzene the 2-acetoxy-8-cryanochrysene melting at 243° C. is obtained in the form of colorless needles. By saponification with alcoholic alkali at water-bath temperature the free 2-hydroxy-8-cyanochrysene is obtained, which crystallizes from chlorobenzene in the form of colorless needles melting at 277° C.

140 parts of crude acetoxy-cyanochrysene obtained according to the above process are heated at 180° C. for 5 hours in an iron autoclave with 170 parts of caustic potash and 400 parts of water. The content of the autoclave is diluted with 2000 parts of water and filtered while hot, and by acidification the hydroxychrysene-carboxylic acid is precipitated from the filtrate; crude yield=110 parts. The 2-hydroxy-chrysene-8-carboxylic acid thus obtained crystallizes from trichloro-benzene in the form of nearly colorless flat crystals which, on heating, decompose at about 290° C. while blackening. The acetyl-compound, colorless needles from trichlorobenzene, melts with decomposition at 356° C.

We claim:

1. The process which comprises heating at a temperature between about 300 C. and 400° C. 2,8-dichloro-chrysene with cuprous cyanide and transforming the chrysene nitrile compound thus obtained into the corresponding chrysene carboxylic acid compound by the action of a saponifying agent.

2. The process which comprises boiling 8-bromo-2-nitro-chrysene in benzylcyanide with cuprous cyanide and transforming the nitrochrysene nitrile compound thus obtained, after reduction of its nitro group to the amino group, into the corresponding chrysene carboxylic acid compound by the action of a saponifying agent.

3. The process which comprises boiling 2-acetoxy-8-bromo-chrysene in benzylcyanide with cuprous cyanide and transforming the 2-acetoxy-8-cyanchrysene thus obtained into the corresponding chrysene carboxylic acid compound by the action of a saponifying agent.

4. As a new product a chrysene-2-carboxylic acid compound containing in the 8 position a radicle of the group consisting of carboxyl, hydroxyl and amino.

5. The compound of the formula:

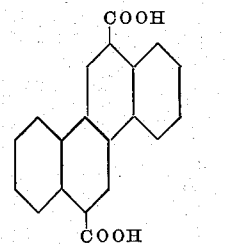

forming a lemon-yellow powder, being nearly insoluble in neutral high-boiling solvents and melting not below 400° C.

6. The compound of the formula:

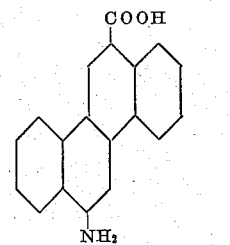

which compound, after recrystallization from glacial acetic acid, occurs in small yellow prisms melting at above 365° C. and shows intense blue fluorescence in a dilute solution thereof in alcohol or glacial acetic acid.

7. The compound of the formula:

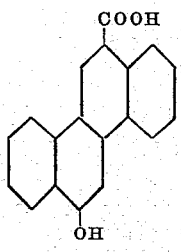

forming nearly colorless level crystals, which on heating at about 290° C. decompose assuming a black color.

8. The process of producing a chrysene carboxylic acid compound which involves the steps of heating with cuprous cyanide, at a temperature between about 200° C. and about 400° C. a halogenated chrysene compound of the formula:

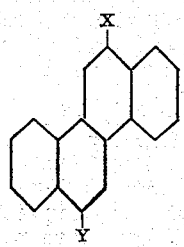

wherein X strands for a halogen and Y stands for a substituent of the group consisting of hydrogen, a halogen, acetoxy and nitro, and transforming the resulting chrysene nitrile compound into the corresponding chrysene carboxylic acid compound by the action of a saponifying agent.

HEINRICH VOLLMANN.
HANS BECKER.